United States Patent Office 3,497,482
Patented Feb. 24, 1970

3,497,482
POLYMERS OF QUATERNARY AMMONIUM COMPOUNDS
Jesse C. H. Hwa, Stamford, Conn., assignor to Rohm & Haas Company, Philadelphia, Pa., a corporation of Delaware
No Drawing. Filed Oct. 14, 1963, Ser. No. 316,163
Int. Cl. C08f 3/90
U.S. Cl. 260—79.3        5 Claims The present invention is concerned with novel, monomeric compounds containing a quaternary ammonium group and either a sulfato or sulfonato group hereinafter referred to generically as a sulfo group. The present invention concerns methods of producing the monomers which are capable of forming polymers by vinyl addition mechanism and is concerned with the polymers thereby obtained.

In accordance with the present invention, there has been prepared novel monomers having the formula

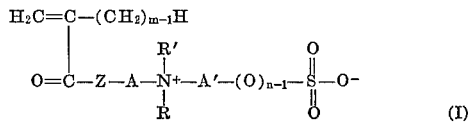

(I)

wherein:

$m$ is an integer having a value of 1 to 4,
Z is selected from the group consisting of —O— and —NH—,
A is an alkylene group having 2 to 6 carbon atoms, at least two of which extend in a chain between the quaternary nitrogen atom and the adjoined Z radical,
R' is an alkyl group having 1 to 4 carbon atoms,
R is an alkyl group having 1 to 4 carbon atoms,
A' is an alkylene group having 2 to 8 carbon atoms, of which 2 to 3 extend in a chain between the quaternary nitrogen atom and the adjoined radical, and
$n$ is an integer having a value from 1 to 2.

One of the essential characteristics of the monomeric and polymeric compounds of the present invention is the fact that in the radical A there are at least 2 carbons extending in a chain between the Z radical and the quaternary N atom. If this group A has a carbon atom which is connected directly to both the Z radical and the quaternary N atom, the compounds of both monomeric and polymeric type are relatively unstable at this point. Another essential is the sulfur-containing radical, which is herein referred to simply as a sulfo group. Substitution of a carboxyl group in place of the sulfo group in the polymeric compounds of the present invention results in loss of antistatic effectiveness. In addition, the analogous carboxylic polymers undergo excessive viscosity variation with change of pH rendering them undesirable and unsatisfactory in many systems of high pH value because of excessive viscosity and resultant handling difficulties.

These monomers may be prepared by reacting an amine of the Formula II with either a sultone of Formula III or a cyclic sulfonate of Formula IV:

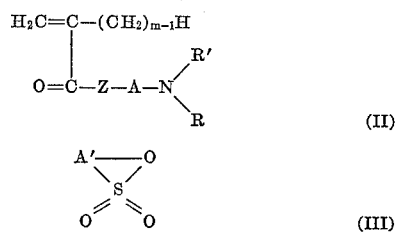

(IV)

the symbols being as defined hereinbefore.

Examples of the alkane sultones of Formula III include 1,2-ethane sultone, 1,3-propane sultone, 1,4-butane sultone, and the alkyl-substituted sultones such as 1-methyl-1,3-propane sultone.

Examples of the cyclic sulfates of Formula IV include ethylene sulfate, 1-methyl-ethylene sulfate, and 1,2-dimethyl-ethylene sulfate.

As the tertiary amines of Formula II there may be used dimethylaminoethyl acrylate or methacrylate, N-(dimethylaminoethyl)-acrylamide or -methacrylamide, dimethylaminopropyl acrylate or methacrylate, and the corresponding N - (dimethylaminopropyl) - acrylamide or -methacrylamide.

The tertiary amine and the cyclic sulfo compound (of either Formula III or Formula IV) are generally used in equimolar proportions although a wide variation from equimolar proportions is permissable.

However, there is no need, and generally no advantage obtained by using an excess of either reactant over the equimolar equivalent of the other reactant. The reaction may be effected merely by mixing the two reactants in bulk, the reaction occurring at room temperature or temperatures below or above room temperature. For example, 10° C. up to 80° C. of higher (depending on the boiling point of the solvent used) may be employed. Generally, temperatures from 30 to 70° C. are preferred. At elevated temperatures it is frequently desirable to use a polymerization inhibitor to prevent polymerization of the monomer produced during its preparation. Instead of gradually mixing the two reactants in bulk, they may be mixed in any suitable solvent of inert character (in regard to the reaction) such as water, or such organic solvents as hydrocarbons (octane, heptane, benzene, toluene, xylene); esters such as ethyl acetate, butyl acetate, amyl acetate, β-hydroxyethyl acetate, the methyl ether of β-hydroxyethyl acetate, 2-hydroxyethoxyethyl acetate; ketones such as acetone, methyl isobutyl ketone; nitriles such as acetonitrile; chlorinated hydrocarbons such as ethylene dichloride, chloroform, carbon tetrachloride; ethers such as dioxane, ethyl ether, methyl isopropyl ether, ethyl butyl ether; and alcohols having from 1 to 6 carbon atoms such as ethanol, methanol, isopropanol, tert-butanol, and cyclohexanol.

The products are generally crystalline solids which precipitate from the reaction medium except when that medium is water, an alcohol, or a mixture thereof. The product may be recovered from the solution in the latter case by evaporation of solvent.

The monomers of Formula I may be employed as additives to spinning solutions, and especially to those containing as the filament-forming material a substance which tends to be hydrophobic. Such materials are, for example, acrylonitrile polymers, polyamides such as nylon 6 and 66, cellulose esters such as cellulose acetate-butyrate and cellulose acetate itself, polyethylene glycol terephthalate, polyethylene, polypropylene, polystyrene, and copolymers of butadiene, acrylonitrile or styrene. The monomers of the present invention are added to the solutions of these filament-forming materials in the amount of about ½ to 5%, based on the weight of filament-forming materials to facilitate the handling of the formed filaments or yarns during the early stages of processing by reducing static charges.

The monomers can be polymerized in conventional ways using, for example, a free-radical catalyst. The polymerization may be effected as a solution polymerization, a suspension polymerization, an emulsion polymerization, or a precipitation polymerization. Any suitable free-radical catalyst may be employed, and especially water-soluble types when the polymerization is to be effected in aqueous media. Examples include hydrogen peroxide, ammonium persulfate, or an alkali metal persulfate. A redox system using such a persulfate with a reducing agent such as sodium hydrosulfite is quite useful. In solution systems involving organic solvents for the monomers and polymers, a free-radical initiator soluble in the particular medium may be employed such as benzoyl peroxide, lauroyl peroxide, tert-butyl peroxide, or hydroperoxide. The usual amounts of initiator may be employed such as from 0.1% to 6% on the weight of the monomer, and in the redox systems the persulfate may be employed in amounts of about ½ to 1% or so in conjunction with about 0.2 to 1% of sodium hydrosulfite. Chain-transfer agents and other molecular weight regulators may be used.

The homopolymers and those copolymers containing a large proportion of the quaternary monomer of Formula I are useful for such purposes as bactericides, fungicides, oil conditioners, antistatic agents for the treatment of hydrophobic plastic materials, such as cellulose esters, and vinyl resins in the form of fibers, filaments, films, yarns, fabric; as dispersants for pigments in coating compositions of either aqueous or organic solvent types; as softening agents for cellulose textiles or films such as rayon, cellophane, cellulose acetate and cotton; as modifying components of film-forming materials (by addition of small amounts to spinning solutions containing such materials) to improve the dyeing of the fibers or other materials that are used, and to modify the hand, the moisture-retention, and tendency to develop static charges of such textile materials. These polymers form a complex with soaps or anionic detergents such as sodium lauryl sulfate and the complex dissolves in water and when deposited on fabrics, provides excellent antistatic qualities.

By copolymerization with one or more other monoethylenically unsaturated monomers, the properties of the final polymer and particularly its solubility may be controlled or predetermined at will.

Examples of comonomers that may be polymerized with the quaternary ammonium sulfo monomer include the vinyl aromatic compounds, more particularly the vinyl aromatic hydrocarbons (e.g. styrene, vinyltoluene, isopropenyl toluene, the various dialkyl styrenes, etc.), other aliphatic compounds containing a $CH_2=C<$ grouping, e.g., acrylonitrile, the various substituted acrylonitriles (e.g., methacrylonitrile, ethacrylonitrile, phenylacrylonitrile, etc.), acrylamide and the various substituted acrylamides (e.g., methacrylamide, ethacrylamide, the various N-substituted acrylamides which are different from those used in practicing the present invention and the various N-substituted alkacrylamides, for instance N-methylol acrylamide, N-monoalkyl- and N,N-dialkyl-acrylamides and -methacrylamides, e.g. N-monomethyl, -ethyl, -propyl, -butyl, etc. and N,N-dimethyl, -diethyl, -dipropyl, -dibutyl, etc., acrylamides and methacrylamides, N-monoaryl and N,N-diaryl acrylamides and alkacrylamides, e.g., N-monophenyl and N,N-diphenyl acrylamides and methacrylamides, etc.), vinyl esters, e.g., vinyl acetate, vinyl propionate, vinyl butyrate, vinyl isobutyrate, vinyl valerate, etc., esters of an acrylic acid (including acrylic acid itself and the various alpha-substituted acrylic acids, e.g., methacrylic acid, ethacrylic acid, phenylacrylic, acid, etc., the lower alpha-alkyl-substituted acids just named being generically represented by the formula

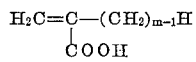

$$H_2C=C-(CH_2)_{m-1}H$$
$$\phantom{H_2C=}\overset{|}{C}OOH$$

wherein $m$ is an integer having a value of 1 to 3), more particularly the alkyl esters of an acrylic acid derived from an alcohol having from 1 to 12 or more carbon atoms, e.g., the ethyl, propyl, isopropyl, n-butyl, isobutyl, sec-butyl, tert-butyl, amyl, hexyl, heptyl, octyl, decyl, dodecyl, etc. esters of acrylic, methacrylic, ethacrylic, phenylacrylic, etc. acids, vinyl ethers, such as butyl vinyl ether, N-vinyl compounds such as N-vinyl pyrrolidinone, and olefins, such as ethylene, fluorinated vinyl compounds, such as vinylidene fluoride, as well as other vinyl aromatic and vinyl aliphatic compounds, and other compounds containing a single $CH_2=C<$ grouping.

Depending upon the particular comonomer selected, the polymer obtained may be changed from water-soluble to oil-soluble, to alcohol-soluble, or to any combination of these solubilities.

The copolymers may contain anywhere from ½% to 99½% of the monomer or of a mixture of monomers of Formula I. Even as low a proportion as ½% of the monomer of Formula I serves to provide copolymers having outstanding utility in the field of impregnating and coating of paper, textiles, leather, as well as other porous and/or flexible substrates. In general, copolymers containing from ½ to 10% of the monomer or monomers of Formula I can be employed to make impregnating or coating compositions which have outstanding characteristics in respect to rheological properties adapting them to high-speed coating operations on automatic coating machines. Thus, in the mineral coating of paper using pigmented coating compositions, such copolymers, especially in connection with clay-containing systems, retain a definite viscosity over a wide pH range, even as high as 9 or 10, which is commonly employed with clear coatings. Whereas, such compositions based on carboxyl-containing copolymers are generally circumscribed in respect to the manner of application by virtue of the fact that substantial viscosity changes occurred as the pH changed, compositions of the same type using the copolymers of the present invention have been found relatively stable as to viscosity over a wide pH range so that good, glossy, smooth coatings can be obtained at high speed without the difficulties heretofore encountered.

Besides the mineral coating of paper, the copolymers are useful as pigment-binding agents in the pigment printing and dyeing of textiles.

Besides the monomer of Formula I and the other monomers mentioned hereinabove, the copolymers may include other monomers containing functional groups which facilitate the cross-linking of the polymer on heating and/or treatment with an acid or alkaline catalyst. The monomers having functional groups may be adapted also to react with the particular substrate which is impregnated or coated with the composition containing copolymers of the present invention. Examples of such cross-linkable comonomers are glycidyl acrylate or methacrylate, N-methylolacrylamide, N-methylol-methacrylamide, N-methoxymethyl-acrylamide, N-methoxymethyl-methacrylamide.

As mentioned hereinabove, the polymers of the present invention, unlike many antistatic compounds, are not poisoned or reduced in effectiveness when fabric carrying a deposit thereof are washed or laundered in anionic detergents. The anionic detergent complexes with the positively-charged ammonium nitrogen, leaving the negatively-charged sulfo group of the copolymer free to assert its antistatic effect.

The copolymers are useful as ion-exchange resins for which purpose they may be prepared with a small proportion (3 to 20% by weight) of a polyethylenically unsaturated comonomer such as divinylbenzene. As ion-exchange resins, they serve to pick up heavy metal ions or those of bulky size such as those of uranium. Such cross-linked resins of the present invention can be used to soak up preferentially anionic or cationic detergents having bulky ions without picking up ordinary metal ions. This characteristic appears to result from the fact that the ions on the units of the polymer itself are too close together to allow the collecting of ordinary metal ions.

Likewise, the resin of the present invention picks up strong acids such as perchloric acid, but not such weak acids as acetic acid.

In the examples which follow, the parts and percentages are by weight.

EXAMPLE 1

A mixture of 785 parts of N,N-dimethylaminoethyl methacrylate and 1190 parts of acetone was heated to 45° C. and 610 parts of 1,3-propane sultone was added gradually, the addition being completed in 1 hour. The reaction was exothermic and was allowed to reflux. At the end of 2 hours, the reaction was complete and the temperature was 35° C. The product was filtered and washed with 450 parts of acetone and dried in a vacuum at 40° C. for 12 hours. Yield of 1354.9 parts of product of the formula

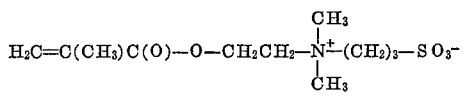

was isolated or 97% of theoretical. M.P. 148–149° C.

*Analysis.*—Calcd.: S, 11.46%. Found: 11.23%.

EXAMPLE 2

17 parts of N-(N′,N′-dimethylaminopropyl)-methacrylamide, 12.2 parts of 1,3-propane sultone, 22 parts of acetone, 0.05 part of monomethyl ether of hydroquinone were mixed and reaction occurred immediately. The reaction mixture was cooled with an ice-bath. Then 80 parts of acetone was added and the precipitate was filtered, washed in 80 parts of acetone, and dried in vacuum for 12 hours. Yield was 23.4 parts or 80% of theoretical of the monomer of the formula

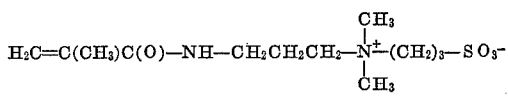

*Analysis.*—Calcd.: S, 10.97%; N, 9.58%. Found: S, 10.77%; N, 9.42%.

EXAMPLE 3

A mixture of 185 parts of 3-N,N-diethylamino)propyl acrylate and 300 parts of acetonitrile was heated to 42° C. and 108 parts of 1,2-ethane sultone was added gradually over a period of 1 hour. The reaction was exothermic and was controlled by refluxing. After 2 hours of refluxing, the product was filtered, washed with 100 parts of acetonitrile and dried in a vacuum at 40° C. for 12 hours. An 80% yield (234 parts) was obtained of the monomer of the formula

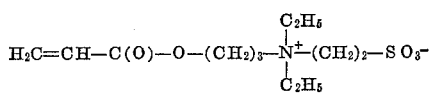

*Analysis.*—Calcd.: S, 10.92%; N, 4.78%. Found: S, 10.87%; N, 4.75%.

EXAMPLE 4

A mixture of 57 parts of 6-(N,N-dibutylamino)-hexyl acrylate and 80 parts of ethyl acetate was heated to 50° C. and 24.5 parts of 1-methyl-1,2-ethane sultone was added gradually over a period of one hour. The reaction was exothermic and was allowed to reflux about four hours. Then, the product was filtered and washed with 40 parts of acetone and dried in a vacuum at 35° C. for 18 hours. There was obtained 44 parts (55% of theoretical) of the product of the formula

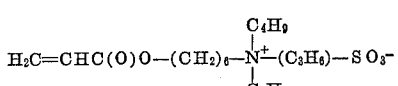

*Analysis.*—Calcd.: N, 3.64%; S, 7.90%. Found: N, 3.44%; S, 7.85%.

EXAMPLE 5

A mixture of 314 parts of β-(N,N-dimethylamino)ethyl methacrylate and 500 parts of acetone was heated to 40° C. and then 248 parts of ethylene sulfate was added gradually over a period of 1 hour. The reaction was exothermic. Reflux was allowed for two hours. Then the product was filtered, washed with 300 parts acetone, and dried under vacuum at 40° C. for 15 hours. A yield of 461 parts (82% of theoretical) was obtained of a compound of the formula

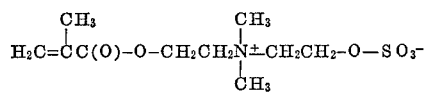

*Analysis.*—Calcd.: N, 4.98%; S, 11.38%. Found: N, 4.97%; S, 11.35%.

EXAMPLE 6

A mixture of 71 parts of N-(β-(N′,N′-dimethylamino)-ethyl) acrylamide and 100 parts of methyl ethyl ketone was heated to 45° C., and then 74 parts of 1,2-propylene sulfate was added gradually over a period of 1 hour. The mixture heated up and refluxing was carried out for about 2 hours. Then the product was filtered, washed with 50 parts of acetone, and dried under a vacuum at 40° C. for 12 hours. A yield of 112 parts (77% of theoretical) was obtained of a compound of the formula

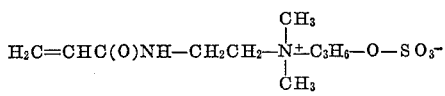

*Analysis.*—Calcd.: N, 9.66%; S, 11.02%. Found: N, 9.38%; S, 10.79%.

EXAMPLE 7

50 parts of the monomer product of Example 1 was dissolved in 116 parts of deionized water containing 8 parts of isopropyl alcohol. Polymerization was initiated by a redox system consisting of 3 p.p.m. of Fe$^{++}$, 0.2% ammonium persulfate and 0.17% sodium metabisulfite. After 15 minutes an exothermic reaction was observed and the temperature rose to 38° C. The reaction was recatalyzed after ½ hour with 0.2% ammonium persulfate and 0.17% sodium metabisulfite.

After 1 and ½ hours a white coacervate of homopolymer was noticed and reaction was continued overnight. Total reaction time was 17½ hours.

The polymer was isolated by precipitation in 2 liters of ethyl alcohol and dried in a vacuum at 55° C. for 14 hours. Polymer yield recovered was 44.2 parts or 88.5% of total.

*Analysis.*—Calcd.: N, 5.02%; S, 11.46%. Found: N, 4.68%; S, 10.75%.

EXAMPLE 8

30 parts of the monomer of Example 2 was dissolved in 70 parts of methanol containing 0.3 part azobis(isobutyronitrile) and heated to reflux. After 2, and 3 hours of reaction, 0.1 part of azobis(isobutyronitrile) was added. Yield of precipitated polymer was 17.7 g. or 59% theoretical.

EXAMPLE 9

A mixture of 10 parts of N-methylol-acrylamide and 40 parts of the monomer of Example 2 was copolymerized in 200 parts deionized water containing 7.7 parts of isopropyl alcohol. 0.1 part of potassium persulfate was used to initiate the polymerization after pH was adjusted to 8 with concentrated ammonium hydroxide. The temperature of the mixture rose to 50° C. After 1 hour the temperature was raised to 70° C., 0.1 part of potassium persulfate was added and the reaction mixture was stirred for 1 hour.

The copolymer was isolated by precipitation in ethyl alcohol (a large excess) followed by drying 18 hours at 40° C. The yield (28.7 parts) was 57.5% of theoretical.

EXAMPLE 10

A mixture of 45 parts of the monomer obtained in Example 4 and 5 parts of acrylamide was copolymerized in 450 parts of deionized water containing 8 parts of isopropyl alcohol. 3 p.p.m. of $Fe^{++}$ was added and polymerization was initiated with 0.2 part of ammonium persulfate and 0.17 part of sodium metabisulfite. A nitrogen gas bleed was used to deoxygenate the system.

An exothermic reaction occurred and after 1 hour, the system was recatalyzed with 0.1 part of amomnium persulfate and 0.08 part of sodium metabisulfite. The reaction was allowed to run overnight.

The polymer was isolated as in Example 9. Yield 32.2 g. or 64.4% of theoretical.

*Analysis.*—Calcd.: N, 5.09%; S, 7.12%. Found: N, 4.85%; S, 7.02%.

EXAMPLE 11

A mixture of 80 parts of the monomer obtained in Example 1 and 20 parts of acrylamide was copolymerized in 400 parts of deionized water with amomnium persulfate and sodium metabisulfite as in Example 8. Analysis of the precipitated polymer:

Calcd.: N, 5.93%; S, 10.8%. Found: N, 6.91%; S, 9.2%.

EXAMPLE 12

In the same way as in Example 10, 50 parts of the monomer of Example 2 and 50 parts of acrylamide were copolymerized in 400 parts of deionized $H_2O$. 99.8% conversion resulted as determined by bromate-bromide titration.

EXAMPLE 13

A mixture of 50 parts of ethyl methacrylate, 30 parts of the monomer of Example 1, and 20 parts of acrylamide were copolymerized in 400 parts of deionized water. 3 p.p.m. of $Fe^{++}$ was added and polymerization was initiated with 0.2 part of ammonium persulfate and 0.17 part of sodium metabisulfite. An exothermic reaction resulted and 99.3% conversion was obtained. The product was a stable copolymer latex having 20.2% solids.

EXAMPLE 14

A mixture of 30 parts of methyl methacrylate, 10 parts of styrene, and 50 parts of the monomer of Example 5 was emulsified in water, the quaternary ammonium monomer serving as emulsifier as well as being an important component of the copolymer obtained in the final latex. The polymerization was effected by the redox system of Example 11 using the same proportion of initiator and promoter.

EXAMPLE 15

A mixture of 10 parts of N-methoxymethyl-acrylamide, 30 parts of the monomer of Example 5, 10 parts of acrylonitrile, and 50 parts of ethylacrylate was prepared in 400 parts of deionized water and 20 parts of isopropyl alcohol. The mixture was adjusted to a pH of 8 with ammonium hydroxide and then 0.2 part of potassium persulfate was added. The temperature rose to 52° C. by exothermic reaction. After one hour, the temperature was raised to 75° C. and an additional 0.2 part of potassium persulfate was added. After another hour, the copolymer which had precipitated was filtered off, washed with water and dried under vacuum at 40° C.

EXAMPLE 16

The process of Example 15 was repeated except that 30 parts of the monomer of Example 6 was used in place of the monomer of Example 5, and 10 parts of glycidyl methacrylate was used in place of the N-methoxymethyl-acrylamide.

EXAMPLE 17

Each of the copolymers of Examples 9 to 12 were formed into separate solutions of 5% concentrations in water. The latices of Examples 13 and 14 were diluted to 10% concentrations, and the copolymers of Examples 15 and 16 were dissolved at 7% concentrations in a mixture of xylene and 2-ethoxyethyl acetate (in a proportion of 60:40 weight percent). Separate pieces of cellulose acetate and 66 nylon fabrics were padded through the several solutions and then dried at room temperature. After being rinsed with an aqueous solution containing 1% of an anionic surfactant such as sodium lauryl sulfate or dodecyl benzene sulfonate, and air-dried, the treated fabrics showed a marked reduction in their tendency to develop static charges. The treated fabrics obtained from the copolymers of Examples 9, 15, and 16 were heated to 150° C. for five minutes. The tendency of these fabrics to develop static charges on rubbing was thereby reduced and the fabrics were resistant to scouring and drycleaning.

EXAMPLE 18

Eighty parts of fine coating clay (kaolin), 20 parts of titanium dioxide, and 0.2 part of sodium hexametaphosphate were mixed in 48 parts of water, and 0.2% (on the weight of clay) of sodium hydroxide was added to adjust the pH to 9. The mixture thus obtained was added to 25 parts by weight of the latex obtained in Example 13 after evaporative concentration of the latex to 50% solids and adjustment to a pH of 9 with ammonium hydroxide.

A dry chipboard (0.017 inch thick) was then coated with the composition (which contained 12% of copolymer on the weight of pigment) by means of a No. 12 wire-wound rod. About 5 to 6 pounds of the coating composition (dry weight) per 1000 sq. ft. of the board was thus applied to one surface. The coated board was dried in an oven by air heated at 185° F. for a period of 45 to 60 seconds. It was then calendered by rolls at room temperature at a pressure of 50 lbs./lineal inch. The coated board had a good, smooth surface highly receptive to ink and resistant to pick (that is removal) by inks having a tack corresponding to No. 4 (Printing Institute Ink Scale).

I claim:

1. A solid addition polymer of a compound of the formula

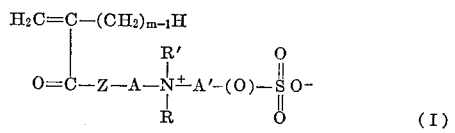

(I)

wherein:

$m$ is an integer having a value of 1 to 4,

Z is selected from the group consisting of —O— and —NH—,

A is an alkylene group having 2 to 6 carbon atoms, at least two of which extend in a chain between the quaternary nitrogen atom and the adjoined Z radical, R' is an alkyl group having 1 to 4 carbon atoms, R is an alkyl group having 1 to 4 carbon atoms, and A' is an alkylene group having 2 to 8 carbon atoms, of which 2 to 3 extend in a chain between the quaternary nitrogen atom and the adjoined radical.

2. A solid addition polymer of a compound of the formula

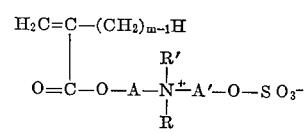

wherein:

$m$ is an integer having a value of 1 to 4,

A is an alkylene group having 2 to 6 carbon atoms, at least two of which extend in a chain between the quaternary nitrogen atom and the adjoined O radical, R' is an alkyl group having 1 to 4 carbon atoms, R is an alkyl group having 1 to 4 carbon atoms, and A' is an alkylene group having 2 to 8 carbon atoms, of which 2 to 3 extend in a chain between the quaternary nitrogen atom and the adjoined radical.

3. A solid addition polymer of a compound of the formula

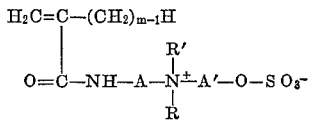

wherein:

*m* is an integer having a value of 1 to 4,

A is an alkylene group having 2 to 6 carbon atoms, at least two of which extend in a chain between the quaternary nitrogen atom and the adjoined NH radical, R' is an alkyl group having 1 to 4 carbon atoms, R is an alkyl group having 1 to 4 carbon atoms, and A' is an alkylene group having 2 to 8 carbon atoms, of which 2 to 3 extend in a chain between the quaternary nitrogen atom and the adjoined radical.

4. A solid addition polymer of a compound of the formula

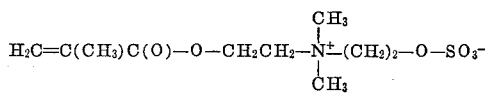

5. A solid addition polymer of a compound of the formula

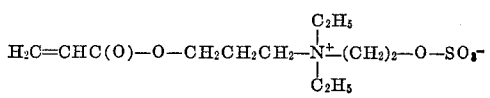

References Cited

UNITED STATES PATENTS 3,280,179  10/1966  Ernst _____ 260—501.12

JAMES A. SEIDLECK, Primary Examiner

U.S. Cl. X.R.

117—139.5, 161; 252—8.57, 8.75; 260—2.1, 29.6, 486, 501.12; 264—176